United States Patent [19]
Smith et al.

[11] Patent Number: 5,106,924
[45] Date of Patent: Apr. 21, 1992

[54] MALEIC ANHYDRIDE-EPOXY RESIN PREPOLYMER, (VINYL OR ISOPROPENYL)PHENYL GLYCIDYL ETHER AND ANHYDRIDE

[75] Inventors: James D. B. Smith, Monroeville; Donald D. Jerson, Mt. Pleasant Township, Westmoreland County, both of Pa.

[73] Assignee: Westinghouse Electric Corp., Pittsburgh, Pa.

[21] Appl. No.: 474,900

[22] Filed: Feb. 5, 1990

[51] Int. Cl.⁵ .............................................. C08L 63/10
[52] U.S. Cl. ...................................... 525/530; 525/903
[58] Field of Search ........................ 525/529, 530, 903

[56] References Cited

U.S. PATENT DOCUMENTS

| | | | |
|---|---|---|---|
| 3,868,613 | 2/1975 | Rogers, Jr. et al. | 336/206 |
| 3,919,348 | 11/1975 | Foster et al. | 525/530 |
| 4,013,987 | 3/1977 | Foster | 336/206 |
| 4,017,453 | 4/1977 | Heilman et al. | 525/530 |
| 4,038,339 | 7/1977 | Foster | 260/835 |
| 4,085,250 | 4/1978 | Smith | 428/418 |
| 4,173,593 | 11/1979 | Smith et al. | 525/109 |
| 4,254,351 | 3/1981 | Smith et al. | 310/45 |
| 4,284,753 | 8/1981 | Hewitt, Jr. | 528/89 |
| 4,356,417 | 10/1982 | Smith et al. | 310/43 |
| 4,652,619 | 3/1987 | Nakajima et al. | 525/529 |

OTHER PUBLICATIONS

Hashimoto et al., "Selective Vinyl Cationic Polymerization of Monomers With Two Cationically Polymerizable Groups II p-Vinylphenyl Glycidyl Ether: An Epoxy-Functionalized Styrene", *Journal of Polymer Science;* Part A: Polymer Chemistry, vol. 25, 2827–2838 (1987).

*Primary Examiner*—John C. Bleutge
*Assistant Examiner*—Robert E. L. Sellers, II

[57] ABSTRACT

An epoxy resinous composition suitable for impregnating windings of turbine generators comprises a reaction product of an epoxy resin and maleic anhydride combined with a vinyl monomer, a (vinyl or isopropenyl)phenyl glycidyl ether which co-reacts with the epoxy diester prepolymer formed from said reaction product, and the polymerized vinyl monomer, and an anhydride.

13 Claims, No Drawings

MALEIC ANHYDRIDE-EPOXY RESIN PREPOLYMER, (VINYL OR ISOPROPENYL)PHENYL GLYCIDYL ETHER AND ANHYDRIDE

FIELD OF THE INVENTION

This invention relates to epoxy resins and compositions, and in particular, to styrene-epoxy-anhydride resin systems suitable for insulating end-windings of electrical generators and motors.

BACKGROUND OF THE INVENTION

Solventless vacuum pressure-impregnated resins have often been employed for coil insulation of electrical generators. Although these materials have excellent electrical performance, modern turbine generators require demanding mechanical performance of the ground wall insulation to withstand higher mechanical loads encountered with longer and larger stator coils, and the like. One approach currently employed is to increase the mechanical properties of the coil insulation by using glass fabric reinforced mica tapes Such resin systems and concepts are disclosed in Smith, et al. U.S. Pat. No. 4,356,417 ('417); Rogers, Jr., et al., U.S. Pat. No. 3,868,613 ('613); Smith, U.S. Pat. No. 4,085,250 ('250); Foster, U.S. Pat. No. 4,013,987 ('987); Foster, et al., U.S. Pat. No. 3,919,348 ('348); Foster, U.S. Pat. No. 4,038,339 ('339); Smith, et al., U.S. Pat. No. 4,173,593 ('593) and Smith, et al., U.S. Pat. No. 4,254,351 ('351), all of which are hereby incorporated by reference.

Foster, et al. ('348) relates to a solventless epoxy-styrene-resin varnish comprising an epoxy resin mixture, an anhydride and a co-reactive vinyl monomer The epoxy resin can include a glycidyl polyether of a dihydric phenol. The vinyl monomer may include a styrene compound Similar epoxy-styrene-anhydride solventless impregnating compositions are disclosed in the above-identified '339; '593; and '351 patents.

Heilman, et al., U.S. Pat. No. 4,017,453, which is also incorporated by reference, relates to a thermosetting composition comprising a vinyl monomer, such as styrene, an anhydride and an epoxy. One of the disclosed diluents includes phenylglycidyl ether in quantities up to about 50% of the polyepoxide.

Hewitt, Jr., U.S. Pat. No. 4,284,753, which is also hereby incorporated by reference, relates a heat-curable epoxy-styrene blend composition This reference teaches a heat-curable composition comprising a polyepoxide, an unsaturated aromatic monomer, such as styrene, an acid anhydride, a cure accelerator composition, and a free-radical curing agent.

Although a number of epoxy systems have been disclosed, there remains a need for enhancing the mechanical properties of resins suitable for use as groundwall insulation for turbine generators. Such a resinous compositions need to have increased tensile strength, tensile modulus, tensile shear, fracture and glass transition properties.

SUMMARY OF THE INVENTION

This invention provides styrene-epoxy-anhydride compositions comprising up to about 20 wt.% of a cross-linking agent, including p-vinylphenyl glycidyl ether (VPGE), p-isopropenylphenyl glycidyl ether (IPGE), or a mixture thereof.

Accordingly, improved mechanical properties of styrene-epoxy-anhydride resins can be achieved by increasing the cross-link density of the fully cured resin by incorporating, in relatively small amounts "co-reactive" monomers, which can simultaneously polymerize with both the styrene and epoxy components of the composition.

This invention also provides a resinous composition suitable for coating end-windings of turbine generators, comprising about 24–34 wt.% epoxy resin, about 0.05 wt.% maleic anhydride, about 44–64% vinyl monomer resin, comprising styrene monomer, vinyl-toluene, tertiary butyl-styrene, or a mixture thereof, about 11–21 wt.% anhydride resin comprising nadic-methyl anhydride, 1-methyl tetrahydrophthalic anhydride, hexahydrophthalic anhydride, 1-methyl hexahydrophthalic anhydride, dodecenyl succinic anhydride, trimellitic anhydride, chloroendic anhydride, benzophenone tetracarboxylic dianhydride, phthalic anhydride or a mixture thereof, and up to about 20 wt.% of a cross-linking agent. This cross-linking agent is capable of co-reacting with both the epoxy resin and the polymerized vinyl monomer to increase the cross-link density of the cured composition.

DETAILED DESCRIPTION OF THE INVENTION

The present invention provides resinous compositions suitable for coating end-windings of turbine generators, and the like, and preferably comprises up to about 20 wt.% of a cross-linking agent, the agent is capable of co-reacting with both the epoxy resin and the polymerized vinyl monomer resin to increase the cross-link density of the cured composition. In the most preferred embodiment, the resin comprises a styrene-epoxy-anhydride comprising up to about 20 wt.% of a cross-linking agent, such as VPGE, IPGE or a mixture thereof.

This invention also provides a turbine generator coil insulated, in part, by a resinous composition comprising a styrene-epoxy-anhydride resin comprising up to about 20 wt.% of a vinyl monomer cross-linking agent capable of simultaneously polymerizing with both said styrene and epoxy components.

The preferred resinous compositions of this invention can include about 24–34 wt.% epoxy resin; about 0–5 wt.%, preferably 0–2 wt.% maleic anhydride; about 44–64 wt.%, preferably about 49–59% vinyl monomer comprising styrene monomer, vinyl-toluene, tertiary butylstyrene, or a mixture thereof; about 11–21 wt.%, preferably about 15–17 wt.% anhydride comprising nadic-methyl anhydride, 1-methyl tetrahydrophthalic anhydride, hexahydrophthalic anhydride, 1-methyl hexahydrophthalic anhydride, dodecenyl succinic anhydride, trimellitic anhydride, chloroendic anhydride, benzophenone tetracarboxylic dianhydride, phthalic anhydride or a mixture thereof; and up to about 20 wt.%, preferably about 5–10 wt.%, of a cross-linking agent, which is capable of co-reacting with both the epoxy resin and the polymerized vinyl monomer to increase the cross-link density of the cured composition.

A preferred composition for the styrene-epoxy-anhydride unmodified resins employed in this invention is shown in the following Table.

TABLE I

| Molar Composition of Cured Styrene-Epoxy-Anhydride Resin* | | | | | |
|---|---|---|---|---|---|
| Component | Molecular Weight | Parts By Wt. | Moles By Wt. | % By Wt. | % Moles | Mole Ratio |
| **EPI-REZ | 380 | 6.25 | 0.016 | 17.89 | 6.69 | 5.26 |

TABLE I-continued
Molar Composition of Cured Styrene-Epoxy-Anhydride Resin*

| Component | Molecular Weight | Parts By Wt. | Moles By Wt. | % By Wt. | % Moles | Mole Ratio |
|---|---|---|---|---|---|---|
| 510 |  |  |  |  |  |  |
| **EPI-REZ | 750 | 3.75 | 0.005 | 10.73 | 2.09 |  |
| 520 |  |  |  |  |  |  |
| Total bisphenol (A) |  |  |  | 28.62 |  |  |
| Maleic Anhydride | 98 | 0.375 | 0.004 | 1.07 | 1.67 | 1.00 |
| Styrene | 104 | 19.0 | 0.183 | 54.37 | 76.57 | 45.85 |
| Nadic Methyl Anhydride | 178 | 5.48 | 0.031 | 15.71 | 12.97 | 7.77 |

*Minor components such as BDMA, Benzoquinone, Luperox 118 and Chromium acetylacetonate are not included in calculation.
**bisphenol (A) epoxy resin Assuming no styrene losses occurred during curing, the resulting molar ratio of the resin components of this unmodified resin system will be shown approximately by the following formula.

$$[E]_5 [A]_1 [S]_{46} [N]_8$$

where
E = epoxy resin
A = maleic anhydride
S = styrene
N = nadic methyl anhydride (NMA)

A "prepolymer" can be prepared for the unmodified resin by reacting maleic anhydride with excess bisphenol (A) epoxy resin at about 85°–90° C. using BDMA as accelerator Since the styrene polymerization reactive site on the resin prepolymer is through the maleic anhydride component (presumably in the fumarate form), the cross-linking segments, involving styrene monomer units, will consist of "polystyrene" chains comprised of 46/2 or 23 styrene units In other words, the styrene cross-links in the 3-dimensional macromolecular structure of the preferred unmodified resin will be 23 styrene units in length. This is because one maleic anhydride unsaturated monomer unit will react (or copolymerize) with 2 styrene monomers.

Because of the length of the styrene cross-links between epoxy/maleic anhydride "prepolymer" chains, (probably >100 angstroms), a very "loose ladder" structure might be expected with the prepolymer chains being a considerable distance apart as shown in the following structure.

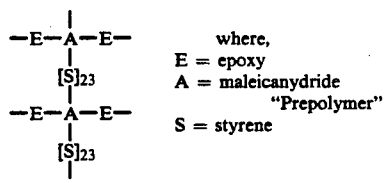

where,
E = epoxy
A = maleicanydride      "Prepolymer"
S = styrene

However, when cross-linking between the epoxy groups (E) and nadic methyl anhydride (N) takes place, with an addition of up to 20 wt.% of the novel co-reactive cross-linking agents of this invention, a much "tighter" network of polymer chains results in which the "prepolymer" chains are closer together and separated only by one anhydride (NMA) molecule (probably <10 angstroms) as shown in the following.

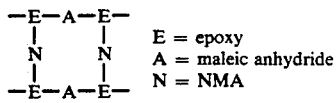

E = epoxy
A = maleic anhydride
N = NMA

This tighter network is a consequence of the fact that any epoxy unit, because of the cross-linking agent, will only react with substantially one NMA unit. Unlike styrene, NMA cannot react or polymerize with itself to form a "homopolymer" structure. However, the actual cross-links found in the resulting preferred resin composition will be a mixture of styrene and NMA units as shown above for both structures.

The above description excludes cross-links between epoxy groups via etherification reactions in illustrating the macromolecular structure for the cured resin. The model does, however, enable some understanding regarding the relative effects of the styrene and NMA components on the mechanical and tensile properties of the cured resin.

As mentioned previously, the "polystyrene" ladders in the unmodified resin can be theoretically calculated to be 23 styrene units in length giving a "loose ladder" structure to the polymer network. By utilizing small amounts of VPGE or IPGE monomer, the polystyrene "ladder" cross-links would be reduced considerably since these monomers would act as "blockers" or "transfer" agents for the propagating styryl radical The free radical species produced from IPGE would be particularly sluggish to polymerize by a free radical mechanism, producing polystyrene "branches" as well as cross-linked segments.

In addition, the pendant epoxy groups produced from the resulting polystyrene "ladders" are understood to be more highly cross-linked than the unmodified resin composition because of the shorter polystyrene "bridges." The amount of VPGE or IPGE added will determine the nature, frequency and length of cross-links. These cured resins can be viewed as a type of cross-linked IPN (Interpenetrating Network) polymer.

Only very small amounts of VPGE and IPGE monomer need be added (typically 1–5% mole %) in place of styrene monomer in the above-described unmodified resin composition of Table 1 to effect these changes The total cross-linking agent comprises less than about 20 wt. of the composition, and preferably about 5–10 wt.%. Thus, the highly desirable properties of the unmodified resin, such as low viscosity, long shelf-life, low dissipation factor and dielectric constant are understood to be retained in the modified resin composition. Also, the higher cross-link density and tighter network of the resin of this invention provide improved higher temperature mechanical and tensile properties.

EXAMPLE 1

Epoxy-styrene-anhydride solventless resin impregnating varnish samples were prepared A two component epoxy resin system was first made by mixing 3.25 parts of a solid low melting diglycidyl ether of bisphenol A, having an epoxy equivalent weight of about 475–575, a purity of about 99.5%, and a Durran's melting point of about 70° C. to 80° C. (sold commercially by Dow Chemical Company under the trade name DER-661) with 6.75 parts of a to liquid diglycidyl ether of bisphenol A, having an epoxy equivalent weight of about 180–200 and a viscosity of between 10,000 to 16,000 cps at 25° C. (sold commercially by Jones-Dabney Company under the trade name Epi-Rez 510). The resins were well blended, and the ratio of solid epoxy to liquid epoxy was 1:2.1.

The resins were then heated to 90° C. Then, to the 10 parts of combined solid-liquid epoxy resin was added 0.375 of a part of maleic anhydride of about 99.5% purity and 0.004 of a part of benzyl dimethyl amine as a catalyst. The catalyzed epoxy-anhydride was held at 90° C. for about 6 hours, during which time it was occasionally stirred, to substantially completely react all of the maleic anhydride, and effect a reaction to the complete epoxy diester stage. The epoxy diester remained fluid, and did not gel. It is preferred to use high purity epoxy materials, since inclusion of impurities may upset the critical weight % balance and reaction mechanisms of these materials.

The acid number of the epoxy diester formed was about 2.5, indicating substantially complete reaction, i.e., about 0.1% maleic anhydride left unreacted. This value was the determined by using the standard acid test, where 1 gram of the epoxy diester was dissolved in 25 grams of dioxane solvent in a flask. Two drops of phenolphthalein indicator was added to color the solution, which was then titrated to the end point with 0.5 N potassium hydroxide. The % maleic anhydride left unreacted was also confirmed using infrared spectral measurements on a Perkin Elmer 700 Spectrophotometer using a smeared epoxy diester sample on NaCl plates.

Three parts of the cross-linking agent P-vinylphenyl glycidyl ether (VPGE), blended with nineteen parts of styrene vinyl monomer, were mixed with 0.012 part para-benzoquinone used as a room-temperature reaction inhibitor. The epoxy diester was allowed to cool to about 60° C., and then the VPGE-styrene-para-benzoquinone mixture was added and stirred in. The inhibited liquid epoxy diesterstyrene mixture was allowed to cool to 25° C. and the viscosity was measured to be about 200 cps at 25° C.

To this inhibited epoxy diester-styrene mixture 5.49 parts of nadic methyl anhydride and 0.048 of a part of 2,5-dimethyl-2,5 bis(benzoyl peroxy) hexane catalyst (sold by Wallace & Tiernan Inc. under the trade name of Luperox 118) were added, at 25° C., to provide the solventless epoxy-styrene-VPGE impregnating varnish. The catalyst used has a catalyst reaction "kick off" temperature of about 115° C., i.e., it will have a definite catalyst effect to initiate a cure reaction at over about 115° C. The viscosity of the epoxy-styrene-VPGE impregnating varnish was measured to be about 200 cps at 25° C.

To this formulation, as a final step, 0.029 of a part of a latent accelerator, chromium acetylacetonate, was added. Gel time of the samples was determined Twenty gram samples were placed in a 2 in. diameter aluminum dish and heated at 135° C. in an oven. To curtail styrene monomer losses in the curing oven, a clock glass was placed over each sample. Storage properties as shown by the change in viscosity of the epoxy-styrene-VPGE impregnating varnish were also measured, in air, by placing 10 gram samples in standard, Pyrex, Gardner-Holt thin walled bubble viscometers of about 10 to 12 milliter volume, with a one milliter air gap. These were stored at 25° C. and 40° C., with intentional exposure to a high degree of fluorescent light irradiation. The tubes were lightly stoppered with an air porous cork permitted a certain amount of air flow (ASTM #D153-56).

Each of the samples was placed in an aluminum cup and baked in an oven about 135° C. for 8 hours to produce a clear, rigid, cured thermoset resin Each of the samples was also gelled in the form of a casting ⅛ inch thick, by being heated at 135° C. for 4 hours, and at a 150° C. final cure for another 8 hours, and tested for dielectric constant and 60 Hz. power factor values at 150° C. The results of the tests are shown below in Table I.

EXAMPLE 2

An epoxy-styrene-anhydride solventless resin impregnating varnish was prepared, as described in EXAMPLE I, using the same methods and test procedures, except that three parts of the cross-linking agent p-isopropenyl phenyl glycidyl ether (IPGE) was blended with nineteen parts of styrene monomer. The experimental results obtained with this formulation are also shown in TABLE II.

TABLE II

| Formulation | Gel Time @ 135° C. (min) | Storage Stability (Days) 25° C. | 40° C. | Power Factor (100×) 150° C. | Dielectric Constant 150° C. |
|---|---|---|---|---|---|
| EXAMPLE 1 | 25-30 | 150+ | 20 | 6.5% | 5.8 |
| EXAMPLE 2 | 20-25 | 150+ | 16 | 6.2% | 5.6 |

The cross-linking monomers of this invention can be utilized in other applications and resin modifications. Some of these include:

(1) The synthesis of co-reactive micabond resins; (2) Modification of the epoxy-anhydride v.p.i. resin and vinyl toluene polybutadiene resins to upgrade their tensile and mechanical properties; (3) Other resin system modifications, e.g., cyanate ester, polyurethanes, polyesters, BMI's and acrylics (especially UV curable types); (4) Solventless resins, having suitable properties for the manufacture of printed wiring board laminates. The inclusion of IPGE or VPGE to these resin formulations would facilitate the B-staging process which is essential in making PWB prepreg laminates. These types of solventless resins may be particularly suitable for continuous lamination processes.

From the foregoing, it can be realized that this invention provides improved resin systems suitable for use as 0 insulating compounds in large generator coils. The styrene-epoxy-anhydride resin systems provided herein, have increased tensile strength, tensile modulus, tensile shear fracture and glass transition because of a "tighter" network of polymer chains, and resulting increased cross-linking density. Although various embodiments have been illustrated, this was for the purpose of describing, but not limiting, the invention. Various modifications, which will become apparent to one skilled in the art, are within the scope of this invention described in the attached claims.

We claim:

1. An epoxy resinous composition, comprising about 24–34 wt.% epoxy resin; maleic anhydride in an amount up to about 5 wt.%, wherein the maleic anhydride is substantially completely reacted with the epoxy resin in an amount sufficient to form an epoxy diester prepolymer; about 44–64 wt.% vinyl monomer comprising styrene, vinyl-toluene, tertiary butyl-styrene, or a mixture thereof; about 11–21 wt.% anhydride comprising nadic-methyl anhydride, 1-methyl tetrahydrophthalic anhydride, hexahydrophthalic anhydride, 1-methyl hexahydrophthalic anhydride, dodecenyl succinic anhydride, trimellitic anhydride, chloroendic anhydride, benzophenone tetracarboxylic dianhydride, phthalic anhydride or a mixture thereof; and a cross-linking agent selected from the group consisting of p-vinylphenyl glycidyl ether, p-isopropenylphenyl glycidyl ether, and mixtures thereof in an amount sufficient to co-react with both said epoxy resin and the polymerized vinyl monomer to increase the cross-link density of the cured composition, the agent being present up to 20 wt. %.

2. The composition of claim 1, comprising about 5–10 wt.% cross-linking agent.

3. The composition of claim 2, comprising about 28–30 wt.% epoxy resin.

4. The composition of claim 3, wherein said epoxy resin comprises bisphenol (A) epoxy resin.

5. The composition of claim 3, wherein the maleic anhydride is present in an amount sufficient to form an epoxy diester prepolymer upon substantially complete reaction with the epoxy resin, the maleic anhydride being present up to 2 wt. %.

6. The composition of claim 5, comprising about 49–59 wt.% styrene monomer.

7. The composition of claim 5, comprising 15–17 wt.% nadic methyl anhydride.

8. An epoxy resinous composition produced by the process of:
   (a) forming an epoxy diester prepolymer by reacting up to about 5 weight percent maleic anhydride, an amount sufficient to form an epoxy diester prepolymer, with an excess of an epoxy compound in an amount of from about 24 to 34 weight percent wherein the maleic anhdride is substantially completely reacted;
   (b) blending a cross-linking agent selected from the group consisting of p-vinylphenyl glycidyl ether, p-isopropenylphenyl glycidyl ether, and mixtures thereof in an amount sufficient to co-react with both said epoxy resin and the polymerized vinyl monomer, in an amount up to about 20 weight percent together with from about 44 to 64 weight percent vinyl monomer selected from the group consisting of styrene monomer, vinyl-toluene, tertiary butyl-styrene, and mixtures thereof; and
   (c) admixing the epoxy diester pre-polymer with the blend of step (b) and with from about 11 to 21 weight percent anhydride selected from the group consisting of nadic-methyl anhydride, 1-methyl tetrahydrophthalic anhydride, hexahydrophthalic anhydride, 1-methyl hexahydrophthalic anhydride, dodecenyl succinic anhydride, trimellitic anhydride, chloroendic anhydride, benzophenone tetracarboxylic dianhydride, phthalic anhydride and mixtures thereof to form the epoxy resinous composition.

9. The epoxy resinous composition produced by the process of claim 8 wherein step (a) is conducted in the presence of a benzyl dimethyl amine catalyst at about 90° C., step (b) is conducted in the presence of para-benzoquinone as a reaction inhibitor, and step (c) is conducted in the presence of 2,5-dimethyl-2,5 bis(benzoyl peroxy) hexane as a catalyst.

10. The epoxy resinous composition produced by the process of claim 8 wherein the gel time at 135° C. is below about 30 minutes.

11. The epoxy resinous composition produced by the process of claim 8 wherein the power factor at 150° C. is from 6.2% to 6.5%.

12. The epoxy resinous composition produced by the process of claim 8 wherein the cross-linking agent is present in an amount of from about 5–10 wt. %.

13. The epoxy resinous composition produced by the process of claim 12 wherein the epoxy compound is bisphenol (A) epoxy and is present in an amount of from about 24–34 wt. %.

* * * * *